United States Patent
Dewanjee

[19]

[11] Patent Number: 6,117,024

[45] Date of Patent: Sep. 12, 2000

[54] GOLF BALL WITH POLYURETHANE COVER

[75] Inventor: Pijush K. Dewanjee, Oceanside, Calif.

[73] Assignee: Callaway Golf Company, Carlsbad, Calif.

[21] Appl. No.: 09/295,635

[22] Filed: Apr. 20, 1999

[51] Int. Cl.[7] .................................................. A63B 37/00
[52] U.S. Cl. .......................... 473/351; 473/365; 473/371; 473/372; 473/373; 473/374; 473/375; 473/376
[58] Field of Search ..................... 473/371, 372, 473/373, 374, 375, 376, 365

[56] References Cited

U.S. PATENT DOCUMENTS

| | | | |
|---|---|---|---|
| 3,034,791 | 5/1962 | Gallagher | 156/182 |
| 3,147,324 | 9/1964 | Ward | 264/254 |
| 3,979,126 | 9/1976 | Dusbiber | 273/218 |
| 3,989,568 | 11/1976 | Isaac | 156/182 |
| 4,062,825 | 12/1977 | Watabe | 260/37 |
| 4,123,061 | 10/1978 | Dusbiber | 273/220 |
| 4,248,432 | 2/1981 | Hewitt et al. | 273/235 R |
| 4,321,183 | 3/1982 | Cox et al. | 524/423 |
| 4,333,782 | 6/1982 | Pieniak | 156/164 |
| 4,349,657 | 9/1982 | Holloway | 528/66 |
| 4,442,282 | 4/1984 | Kolycheck | 528/83 |
| 4,734,311 | 3/1988 | Sokolowski | 428/152 |
| 4,870,142 | 9/1989 | Czerwinski et al. | 525/528 |
| 5,006,297 | 4/1991 | Brown et al. | 264/234 |
| 5,047,495 | 9/1991 | Kolycheck | 528/76 |
| 5,159,053 | 10/1992 | Kolycheck et al. | 528/76 |
| 5,181,717 | 1/1993 | Donntag | 273/58 BA |
| 5,308,894 | 5/1994 | Laughner | 523/436 |
| 5,334,673 | 8/1994 | Wu | 273/235 R |
| 5,368,304 | 11/1994 | Sullivan et al. | 273/220 |
| 5,484,870 | 1/1996 | Wu | 528/28 |
| 5,688,191 | 11/1997 | Cavallaro et al. | 473/373 |
| 5,692,974 | 12/1997 | Wu et al. | 473/377 |
| 5,703,193 | 12/1997 | Rosenberg et al. | 528/44 |
| 5,779,562 | 7/1998 | Melvin | 473/373 |
| 5,800,286 | 9/1998 | Kakiuchi | 473/365 |
| 5,803,831 | 9/1998 | Sullivan et al. | 473/374 |
| 5,813,923 | 9/1998 | Cavallaro et al. | 473/373 |
| 5,873,796 | 2/1999 | Cavallaro | 473/365 |
| 5,879,244 | 3/1999 | Hwang | 473/373 |
| 5,879,596 | 3/1999 | Roach | 264/28 |
| 5,885,172 | 3/1999 | Hebert et al. | 473/354 |
| 5,888,437 | 3/1999 | Calabria et al. | 264/135 |
| 5,908,358 | 6/1999 | Wu | 473/378 |

FOREIGN PATENT DOCUMENTS

| | | |
|---|---|---|
| 1504629 | 1/1973 | Germany . |
| PCT/US98/ 03334 | 2/1998 | WIPO . |

OTHER PUBLICATIONS

A. Singh, "p–Phenylene Diisocyanate Based Polyurethane Elastomers", Advances in Urethane Science and Technology vol. 13 (Eds. K. Frisch & D. Klempher, 1996).

B.S. Lombardo, et al., "Advances in PPDI Prepolymer Technology", Uniroyal Chemical Company, Inc., Middlebury, Connecticut 06749.

*Primary Examiner*—Stephen F. Gerrity
*Assistant Examiner*—Paul D. Kim
*Attorney, Agent, or Firm*—Michael A. Catania

[57] ABSTRACT

A golf ball having a cover composed of a polyurethane formed from a p-phenylene diisocyanate (PPDI) based polyurethane prepolymer is disclosed herein. The PPDI-based polyurethane prepolymer is formed from a PPDI and a polyol such as polycaprolactone. The PPDI-based polyurethane prepolymer is cured with a curative such as a 1,4 butane diol and glycol. The PPDI-based polyurethane cover may be either thermoset or thermoplastic. The PPDI-based polyurethane cover has a high flexural modulus at a lower hardness which gives a better feel yet maintains good distance, higher Bashore resilience, higher tensile strength, higher tear resistance, improved elongation, and better playability and control. These benefits and improvements are exhibited even though the cover of the present invention is thinner than those of conventional golf balls. The present invention also provides new golf balls having durable thin covers thereby enabling golf balls with large cores. It is well understood that increasing the core diameter of a golf ball generally translates into an increased COR which in turn generally translates into an increased initial velocity and enhanced overall travel distance.

22 Claims, 1 Drawing Sheet

GOLF BALL WITH POLYURETHANE COVER

CROSS REFERENCES TO RELATED APPLICATIONS

Not Applicable

STATEMENT REGARDING FEDERALLY SPONSORED RESEARCH

Not Applicable

BACKGROUND OF THE INVENTION

1. Field of the Invention

The present invention relates to golf balls and golf ball cover materials. More specifically, the present invention relates to golf balls having cover materials containing a polyurethane formed from a para-phenylene diisocyanate prepolymer.

2. Description of the Related Art

Conventionally golf balls are made by molding a cover around a core. The core may be wound or solid. A wound core typically comprises elastic thread wound about a solid or liquid center. Unlike wound cores, solid cores do not include a wound elastic thread layer. Solid cores typically may comprise a single solid piece center or a solid center covered by one or more mantle or boundary layers of material.

The cover may be injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess. In one exemplary compression molding process, a cover material is pre-formed into half-shells, which are placed into a respective pair of compression mold cavities. The core is placed between the cover material half-shells and the mold is closed. The core and cover combination is then exposed to heat and pressure, which cause the cover half-shells to combine and form a full cover.

As with the above-referenced processes, a casting process also utilizes pairs of mold cavities. In a casting process, a cover material is introduced into a first mold cavity of each pair. Then, a core is held in position (e.g. by an overhanging vacuum or suction apparatus) to contact the cover material in what will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Materials previously used as golf ball covers include balata (natural or synthetic), gutta-percha, ionomeric resins (e.g., DuPont's SURLYN®), and polyurethanes. Balata is the benchmark cover material with respect to sound (i.e. the sound made when the ball is hit by a golf club) and feel (i.e. the sensation imparted to the golfer when hitting the ball). Natural balata is derived from the Bully Gum tree, while synthetic balata is derived from a petroleum compound. Balata is expensive compared to other cover materials, and golf balls covered with balata tend to have poor durability (i.e. poor cut and shear resistance). Gutta percha is derived from the Malaysian sapodilla tree. A golf ball covered with gutta percha is considered to have a harsh sound and feel as compared to balata covered golf balls.

Ionomeric resins, as compared to balata, are typically less expensive and tend to have good durability. However, golf balls having ionomeric resin covers typically have inferior sound and feel, especially as compared to balata covers.

A golf ball with a polyurethane cover generally has greater durability than a golf ball with a balata cover. The polyurethane covered golf ball generally has a better sound and feel than a golf ball with an ionomeric resin cover. Polyurethanes may be thermoset or thermoplastic. Polyurethanes are formed by reacting a prepolymer with a polyfunctional curing agent, such as a polyamine or a polyol. The polyurethane prepolymer is the reaction product of, for example, a diisocyanate and a polyol such as a polyether or a polyester. Several patents describe the use of polyurethanes in golf balls.

Gallagher, U.S. Pat. No. 3,034,791 discloses a polyurethane golf ball cover prepared from the reaction product of poly(tetramethylene ether) glycol and toluene-2,4-diisocyanates (TDI), either pure TDI or an isomeric mixture.

Isaac, U.S. Pat. No. 3,989,568 ("the '568 patent) discloses a polyurethane golf ball cover prepared from prepolymers and curing agents that have different rates of reaction so a partial cure can be made. The '568 patent explains that "the minimum number of reactants is three." Specifically, in '568 patent, two or more polyurethane prepolymers are reacted with at least one curing agent, or at least one polyurethane prepolymer is reacted with two or more curing agents as long as the curing agents have different rates of reaction. The '568 patent also explains that "[o]ne of the great advantages of polyurethane covers made in accordance with the instant invention is that they may be made very thin . . . ", and "[t]here is no limitation on how thick the cover of the present invention may be but it is generally preferred . . . that the cover is no more than about 0.6 inches in thickness." The examples in the '568 patent only disclose golf balls having covers that are about 0.025 inches thick.

Dusbiber, U.S. Pat. No. 4,123,061 ("the '061 patent") discloses a polyurethane golf ball cover prepared from the reaction product of a polyether, a diisocyanate and a curing agent. The '061 patent discloses that the polyether may be polyalkylene ether glycol or polytetramethylene ether glycol. The '061 patent also discloses that the diisocyanate may be TDI, 4,4'-diphenylmethane diisocyanate ("MDI"), and 3,3'-dimethyl-4,4'-biphenylene diisocyanate ("TODI"). Additionally, the '061 patent discloses that the curing agent may be either a polyol (either tri- or tetra-functional and not di-functional) such as triisopropanol amine ("TIPA") or trimethoylol propane ("TMP"), or an amine-type having at least two reactive amine groups such as: 3,3'dichlorobenzidene; 3,3'dichloro 4,4'diamino diphenyl methane ("MOCA"); N,N,N',N'tetrakis (2-hydroxy propyl) ethylene diamine; or Uniroyal's Curalon L which is an aromatic diamine mixture.

Hewitt, et al., U.S. Pat. No. 4,248,432 ("the '432 patent") discloses a thermoplastic polyesterurethane golf ball cover formed from a reaction product of a polyester glycol (molecular weight of 800–1500) (aliphatic diol and an aliphatic dicarboxylic acid) with a para-phenylene diisocyanate ("PPDI") or cyclohexane diisocyanate in the substantial absence of curing or crosslinking agents. The '432 patent teaches against the use of chain extenders in making polyurethanes. The '432 patent states, "when small amounts of butanediol-1,4 are mixed with a polyester . . . the addition results in polyurethanes that do not have the desired balance of properties to provide good golf ball covers. Similarly, the use of curing or crosslinking agents is not desired . . . "

Holloway, U.S. Pat. No. 4,349,657 ("the '657 patent") discloses a method for preparing polyester urethanes with PPDI by reacting a polyester (e.g. prepared from aliphatic glycols having 2–8 carbons reacted with aliphatic dicarboxylic acids having 4–10 carbons) with a molar excess of PPDI to obtain an isocyanate-terminated polyester urethane (in liquid form and stable at reaction temperatures), and then reacting the polyester urethane with additional polyester. The '657 patent claims that the benefit of this new process is the fact that a continuous commercial process is possible without stability problems. The '657 patent further describes a suitable use for the resultant material to be golf ball covers.

Kolycheck, U.S. Pat. No. 4,442,282 ("the '282 patent") discloses a thermoplastic polyesterurethane golf ball cover formed by reacting a 1,12-dodecandioc acid polyester (molecular weight of about 1500–5000) with MDI. The '282 patent teaches that "[t]he use of chain extenders in making the polyurethanes is not normally desired and may result in polyurethanes that do not have the desired balance of properties to provide good golf ball covers. Similarly, the use of curing or crosslinking agents is not desired . . . "

Wu, U.S. Pat. No. 5,334,673 ("the '673 patent") discloses a polyurethane prepolymer cured with a slow-reacting curing agent selected from slow-reacting polyamine curing agents and difunctional glycols (i.e., 3,5-dimethylthio-2,4-toluenediamine, 3,5-dimethylthio-2,6-toluenediamine, N,N'-dialkyldiamino diphenyl methane, trimethyleneglycol-di-p-aminobenzoate, polytetramethyleneoxide-di-p-aminobenzoate, 1,4-butanediol, 2,3-butanediol, 2,3-dimethyl-2,3-butanediol, ethylene glycol, and mixtures of the same). The polyurethane prepolymer in the '673 patent is disclosed as made from a polyol (e.g., polyether, polyester, or polylactone) and a diisocyanate such as MDI or TODI. The polyether polyols disclosed in the '673 patent are polytetramethylene ether glycol, poly(oxypropylene) glycol, and polybutadiene glycol. The polyester polyols disclosed in the '673 patent are polyethylene adipate glycol, polyethylene propylene adipate glycol, and polybutylene adipate glycol. The polylactone polyols disclosed in the '673 patent are diethylene glycol initiated caprolactone, 1,4-butanediol initiated caprolactone, trimethylol propane initiated caprolactone, and neopentyl glycol initiated caprolactone.

Cavallaro, et al., U.S. Pat. No. 5,688,191 discloses a golf ball having core, mantle layer and cover, wherein the mantle layer is either a vulcanized thermoplastic elastomer, functionalized styrene-butadiene elastomer, thermoplastic polyurethane, metallocene polymer or blends of the same and thermoset materials.

Wu, et al., U.S. Pat. No. 5,692,974 discloses golf balls having covers and cores that incorporate urethane ionomers (i.e. using an alkylating agent to introduce ionic interactions in the polyurethane and thereby produce cationic type ionomers).

Sullivan, et al., U.S. Pat. No. 5,803,831 ("the '831 patent") discloses a golf ball having a multi-layer cover wherein the inner cover layer has a hardness of at least 65 Shore D and the outer cover layer has a hardness of 55 Shore D or less, and more preferably 48 Shore D or less. The '831 patent explains that this dual layer construction provides a golf ball having soft feel and high spin on short shots, and good distance and average spin on long shots. The '831 patent provides that the inner cover layer can be made from high or low acid ionomers such as SURLYN®, ESCOR® or IOTEK®, or blends of the same, nonionomeric thermoplastic material such as metallocene catalyzed polyolefins or polyamides, polyamide/ionomer blends, polyphenylene ether/ionomer blends, etc., (having a Shore D hardness of at least 60 and a flex modulus of more than 30000 psi), thermoplastic or thermosetting polyurethanes, polyester elastomers (e.g. HYTREL®), or polyester amides (e.g. PEBEX®), or blends of these materials. The '831 patent also provides that the outer cover layer can be made from soft low modulus (i.e. 1000–10000 psi) material such as low-acid ionomers, ionomeric blends, non-ionomeric thermoplastic or thermosetting materials such as polyolefins, polyurethane (e.g. thermoplastic polyurethanes like TEXIN®, PELETHANE®, and thermoset polyurethanes like those disclosed in Wu, U.S. Pat. No. 5,334,673), polyester elastomer (e.g. HYTREL®), or polyester amide (e.g. PEBEX®), or a blend of these materials.

Hebert, et al., U.S. Pat. No. 5,885,172 ("the '172 patent") discloses a multilayer golf ball giving a "progressive performance" (i.e. different performance characteristics when struck with different clubs at different head speeds and loft angles) and having an outer cover layer formed of a thermoset material with a thickness of less than 0.05 inches and an inner cover layer formed of a high flexural modulus material. The '172 patent provides that the outer cover is made from polyurethane ionomers as described in Wu, et al., U.S. Pat. No. 5,692,974, or thermoset polyurethanes such as TDI or methylenebis-(4-cyclohexyl isocyanate) ("HMDI"), or a polyol cured with a polyamine (e.g. methylenedianiline (MDA)), or with a trifunctional glycol (e.g., N,N,N',N'-tetrakis(2-hydroxpropyl)ethylenediamine). The '172 also provides that the inner cover has a Shore D hardness of 65–80, a flexural modulus of at least about 65,000 psi, and a thickness of about 0.020–0.045 inches. Exemplary materials for the inner cover are ionomers, polyurethanes, polyetheresters (e.g. HYTREL®), polyetheramides (e.g., PEBEX®), polyesters, dynamically vulcanized elastomers, functionalized styrene-butadiene elastomer, metallocene polymer, blends of these materials, nylon or acrylonitrile-butadiene-styrene copolymer.

Wu, U.S. Pat. No. 5,484,870 ("the '870 patent") discloses golf balls having covers composed of a polyurea composition. The polyurea composition disclosed in the '870 patent is a reaction product of an organic isocyanate having at least two functional groups and an organic amine having at least two functional groups. One of the organic isocyanates disclosed by the '870 patent is PPDI.

Nesbitt, U.S. Pat. No. 4,431,193 ("the '193 patent") discloses a multi-layered golf ball having a two-layer cover. The '193 patent describes a golf ball having a cover composed of an inner layer of hard high flexural modulus resinous material, cellular or foam composition having a high coefficient of restitution, and an outer layer of a comparatively soft low flexural modulus resinous material, cellular or foam composition. The '193 patent also describes that the inner cover layer is preferably about 0.02–0.07 inches thick and the outer cover layer is preferably about 0.02–0.10 inches thick. The '193 patent explains that this dual layer cover construction provides an increased coefficient of restitution and a balata feel. However, each layer of the cover of the '193 patent is composed of an ionomer (e.g. SURLYN®), and therefore, the golf balls suffer from the performance deficiencies described above.

Although the prior art has disclosed golf ball covers composed of many different materials, none of these golf balls have proven completely satisfactory. Dissatisfaction, for example, remains with processing and manufacturing the balls, and with the balls' durability and performance.

Specifically, with respect to processing, prior materials are not user friendly because certain starting materials may be unhealthful, such as diamines and isocyanides. In addition, prior balls using such materials are generally wound balls. Wound balls have tolerances that are more difficult to control due to core sizes and/or windings sizes, and therefore, require thicker cover layers to account for the manufacturing tolerances. With respect to durability problems, prior polyurethane covered balls, because they are wound balls, tend to lose compression and initial velocity due to the windings relaxing over time and use. With respect to performance problems, prior balls, as a general rule, tend to have smaller cores that result in shorter flight distances.

Although many golf balls having a polyurethane cover have been provided by the prior art, these golf balls have failed to capture the sound and feel of balata while providing a golf ball with the durability of an ionomer. One material of interest disclosed in the golf ball prior art is PPDI. However, the golf ball prior art has been unable to capture its full potential, and thus PPDI has been ignored or utilized as just another diisocyanate in conventional polyurethane formulations. Thermoplastic and castable elastomer polyurethanes from PPDI are known for use in high performance parts such as, for example, seals and gaskets, tires and wheels, and pump parts. See, e.g., A. Singh, "p-Phenylene Diisocyanate Based Polyurethane Elastomers", Advances in Urethane Science and Technology Vol. 13 (Eds. K. Frisch & D. Klempher, 1996). Several patents outside of the golf ball industry also disclose forming polyurethanes from PPDI.

Kolycheck, U.S. Pat. No. 5,159,053 ("the '053 patent") discloses a thermoplastic polyurethane having electrostatic dissipative properties, an average molecular weight of about 60,000–500,000, and composed of a hydroxyl terminated ethylene ether oligomer glycol intermediate (i.e. a polyethylene glycol) reacted with a non-hindered diisocyanate (e.g. PPDI, MDI, 1,5-naphthalene diisocyanate ("NDI"), m-xylene diisocyanate ("XDI"), 1,4-cyclohexyl diisocyanate ("CHDI") and an extender glycol (e.g. diethylene glycol, 1,3-propane diol, 1,4-butane diol, 1,5-pentane diol, and 1,6-hexane diol) to produce a high molecular weight thermoplastic polyurethane. The '053 patent describes the material as "useful as an elastomeric melt or binder in a fabric reinforced flexible fuel tank" and "as sheets or films, fuel handling [devices] including vapor return equipment and fuel lines, business equipment, coatings for floors such as clean rooms and construction, floorings, mats, electronic packaging and housings, chip holders, chip rails, tote bins and tote bin tops and medical applications."

Ohbuchi, et al., U.S. Pat. No. 5,066,762 ("the '762 patent") discloses a thermoplastic polyurethane resin obtained by reacting a PPDI, hydroxyl terminated poly (hexamethylene carbonate) polyol (obtained by reacting 1,6-hexane glycol with diphenyl carbonate, diethyl carbonate, ethylene carbonate, etc., and a triol) and a short chain polyol (e.g., ethylene glycol, 1,3-propylene glycol, 1,4-butane diol, neopentyl glycol, 3-methyl-1,5-pentane diol, p-xylene glycol, 1,4-bis-(β-hydroxyethoxy)benzene, 1,3-bis-(β-hydroxyethoxy)benzene, cyclohexane,1,4-dimethanol, octane-1,8-diol, decane-1,10-diol, etc., or a mixture) as an extending agent. The '762 patent also discloses that the poly(hexamethylene carbonate) polyol can be mixed with poly(butylene adipate) polyol, polycaprolactone polyol, poly(hexamethylene adipate) polyol, etc., but that the material's performance is adversely affected by such an addition. The '762 patent further explains that a triol can be included in the diol to aid in crosslinking if needed. Asserted material improvements are in hydrolysis resistance, heat deterioration resistance, temperature dependency and compression set. The '762 patent explains that suitable uses for the material are "for the production of articles of small size such as precise parts including packing, sound-damping gear, bearing, joint, parts for precise machines, automotive parts, electronic instrument parts, etc., . . . belt[s], hose[s], tube[s], sheet[s], film[s], etc. by extrusion [molding]."

Kolycheck U.S. Pat. No. 5,047,495 ("the '495 patent") discloses a polyurethane reinforced fabric molded flexible fuel tank. The fuel tank of the '495 patent is composed of a high molecular weight thermoplastic polyurethane polymer binder formed from the reaction product of an ethylene ether oligomer glycol intermediate (a hydroxyl terminated diethylene glycol aliphatic linear polyester, or a polyethylene glycol) and a non-hindered diisocyanate (e.g. PPDI, MDI, NDI, XDI or CHDI) and an extender glycol (e.g. diethylene glycol, 1,3-propane diol, 1,4-butane diol, 1,5-pentane diol, and 1,6-hexane diol). The '495 patent describes the material as having good fuel resistance and as useful in making resilient fuel tanks and containers when combined with fibrous mat reinforcement material.

Watabe, et al., U.S. Pat. No. 4.062,825 discloses a polyurethane prepared by mixing prepolymer (e.g. PPDI among many others) with finely divided acidic silica particles and curative thereby providing a polyurethane having high tear strength.

However, none of these polyurethanes have proven satisfactory for use in golf balls or, more particularly, as golf ball covers. For example, such materials tend to be too 'clicky' (i.e. with respect to sound) and not sufficiently abrasion resistant. In addition, such materials are not sufficiently durable to make golf ball covers thinner than about 0.05 inches. Furthermore, a thermoplastic with reinforced fabric, as may be suggested by Kolycheck, should not be used in golf ball materials because such an addition would adversely affect at least some of those physical properties of the thermoplastic which are particularly desirable for golf balls such as COR and rebound. These patents are not the denouement of the use of PPDI in the formation of a polyurethane. Thus, there remains a need for a golf ball that has the sound and feel of a golf ball with a balata cover, while providing the outstanding durability of a golf ball with an ionomer cover.

BRIEF SUMMARY OF THE INVENTION

The present invention provides a golf ball with the sound and feel of a golf ball with a balata cover, and the durability of a golf ball with an ionomer cover. The present invention is able to accomplish this by providing a novel polyurethane system that is particularly useful as a golf ball cover material.

The material of the present invention does not exhibit the above-described deficiencies in the prior polyurethane systems. The material of the present invention provides a golf ball cover having improved durability and improved sound and feel over the prior golf ball covers. In addition, golf balls including a cover made of the material of the present invention have comparable or higher COR, and higher rebound at similar or lower hardness. Therefore, a golf ball cover of the present invention contributes to good durability, increased overall travel distance, better playability and control, and enhanced sound and feel of a golf ball including such a cover.

Furthermore, the present invention provides a polyurethane system that allows post-curing at higher temperatures than is provided in the prior art. Higher temperature post-curing enables use of a very thin cover layer and toughens the material making it more durable. Such post-curing also provides improved Bayshore rebound, improved tensile strength, and improved tear resistance and elongation, as compared to prior systems.

One aspect of the present invention is a golf ball cover composed of a polyurethane system formed from a PPDI-based prepolymer. The PPDI-based prepolymer is formed by a reaction of PPDI with an ester polyol, a polyether polyol or a blend of more than one of these compounds. Preferably, the compound has a molecular weight range of about 250–3500. A preferred compound is polycaprolactone. The PPDI prepolymer is then cured with an agent for a set period of time. The agent may be a diol (e.g., 1,4 butane diol, trimethylpropanol, etc.), a mixture of diols (e.g., 1,4 butane diol and ethylene glycol, or other suitable glycols), a hydroquinone, a mixture of hydroquinones, a triol, a mixture of triols, a diamine, a mixtures of diamines, an oligomeric diamine, or a blend of some or all of these materials. The polyurethane system may be either thermoset (i.e. functional in cast manufacturing) or thermoplastic (i.e. functional in injection molding).

Polyurethane systems based on PPDI give higher flexural modulus when compared to polyurethane systems based on other materials such as MDI and TDI. This higher flexural modulus for PPDI is believed to be due to the more uniform hard segment distribution of the PPDI-based material. In addition, it is believed that the rigid rod-like structure of PPDI, as compared to the more bulky or hindered structures of MDI and TDI, provide PPDI-based polyurethane systems relatively superior physical properties. Some of these physical properties include increased Bashore resilience, increased tensile strength, increase tear resistance, improved elongation, and a lower tan δ value. The tan δ value measures the amount of energy a material loses as heat upon a high distortion or impact event (i.e. hysteresis). See, B. S. Lombardo, et al., "Advances in PPDI Prepolymer Technology", Uniroyal Chemical Company, Inc., Middlebury, Conn. 06749, which is hereby incorporated by reference as if fully set forth herein.

Another aspect of the present invention is a golf ball including a core with a diameter of about 1.35–1.70 inches, or more preferably between about 1.40–1.65 inches, or most preferably between about 1.45–1.60 inches, and a polyurethane cover having a thickness of between about 0.02–0.09 inches, or more preferably between about 0.02–0.065 inches, or most preferably between about 0.02–0.04 inches.

Another aspect of the present invention is a golf ball with a core having a diameter of about 1.35–1.7 inches, or more preferably between about 1.4–1.65 inches, or most preferably between about 1.45–1.6 inches, one or more boundary or mantle layer(s) having a total combined thickness of between about 0.02–0.09 inches, or more preferably between about 0.02–0.075 inches, or most preferably between about 0.02–0.067 inches, and a polyurethane cover having a thickness of between about 0.02–0.09 inches, or more preferably between about 0.02–0.065 inches, and most preferably between about 0.02–0.04 inches.

Another aspect of the present invention is a golf ball having a polybutadiene inner core with a diameter of between about 1.35–1.7 inches, a thermoplastic boundary or mantle layer having a wall thickness of between about 0.02–0.09 inches, and a polyurethane cover having a wall thickness of between about 0.02–0.09 inches. It is preferred that the ratio of core diameter to the wall thickness of the cover be in the range of about 15:1 to 90:1, and more preferably in the range of about 25:1 to 77.5:1, and most preferably in the range of about 35:1 to 65:1. For example, for a ball having an overall diameter of about 1.68 inches, one embodiment most preferably has an inner core having a diameter of about 1.45–1.6 inches, a mantle layer having a thickness of about 0.02–0.067 inches, and a cover having a thickness of about 0.02–0.04 inches. In another example, for a ball having an overall diameter of about 1.8 inches, a preferred embodiment has an inner core with a diameter of about 1.6–1.72 inches, a boundary layer having a wall thickness of about 0.02–0.067 inches, and a cover with a thickness of about 0.02–0.04 inches.

Another aspect of the present invention is a golf ball having a solid core of an elastomeric material having a diameter of between about 1.35–1.70 inches, and a PGA compression of between about 50–80, a boundary layer of a thermoplastic material having a hardness of between about 52–65 Shore D, a flexural modulus of between about 25,000–65,000 psi, and a wall thickness of between about 0.02–0.09 inches, and a cover having a hardness of between about 45–60 Shore D, a flexural modulus of between about 12,000–35,000 psi, a Bashore resilience of between about 57–65, a tensile strength of between about 5900–7500 psi, and a wall thickness of between about 0.02–0.09 inches.

It is a primary object of the present invention to provide a golf ball having a cover made from a new polyurethane system.

Other objects and features of the present invention will become apparent from consideration of the following description taken in conjunction with the accompanying drawings.

DETAILED DESCRIPTION OF THE INVENTION

The present invention provides a new polyurethane system which is particularly useful as a golf ball cover material having improved durability, improved sound and feel, higher COR, higher flexural modulus at lower hardness, a lower tan δ, and higher rebound, and, therefore, contributes to an increased initial velocity, enhanced overall travel distance, and better playability and control.

Golf balls of the present invention generally include a solid core and a cover. One or more boundary or mantle layers may optionally be provided between the core and cover. In the preferred embodiment, the golf ball of the present invention includes a solid core, a boundary layer (preferably comprising a thermoplastic material), and a cover of polyurethane. Preferably all embodiments of the present invention include a cover made by casting the polyurethane cover over the core/boundary layer combination.

Figure 1:
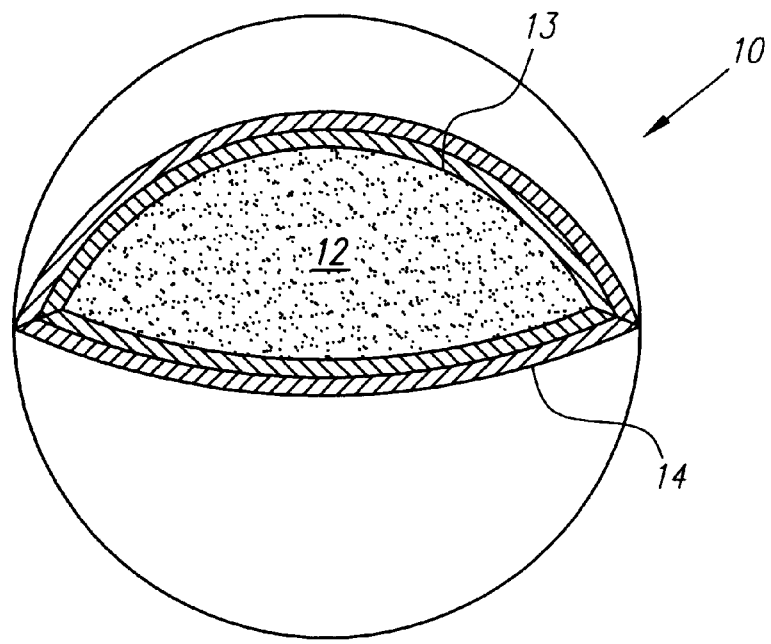
FIG. 1 illustrates a perspective view of a golf ball of the present invention including cut-away portion showing a core, a boundary layer, and a cover.
Figure 2:
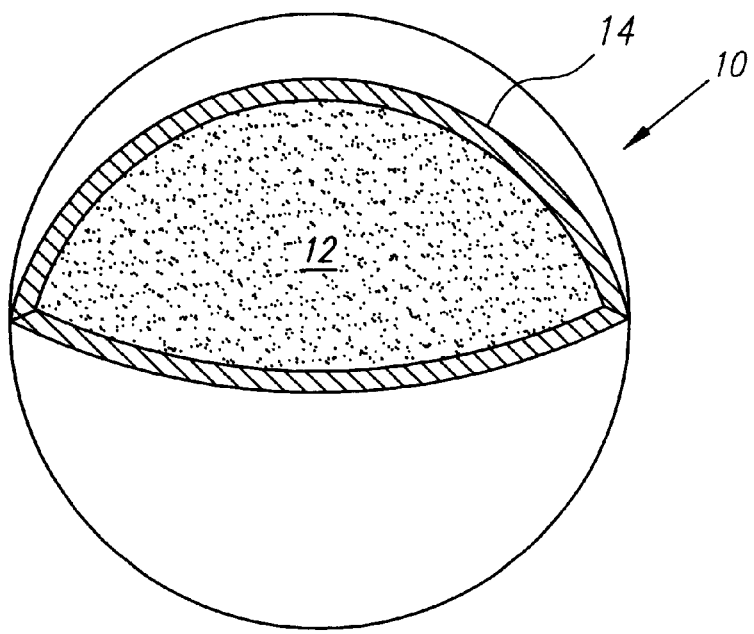
FIG. 2 illustrates a perspective view of a golf ball of the present invention including a cut-away portion core and a cover.

As is shown in FIG. 1, a first embodiment golf ball comprises a cover 14 over an inner core 12 and a boundary layer 13. The boundary layer 13 may be a single layer, as shown, or multiple layers. In this embodiment, the inner core 12 is preferably compression molded to yield a single layer solid core, the boundary layer 13 is preferably injection molded over the core, and the cover 14 is preferably cast over the boundary layer 13 and core 12 (which, preferably, has been pre-heated). The casting process is described below. As shown in FIG. 2, the golf ball has only a core 12 and a cover 14.

The solid core 12 of the golf ball is generally composed of a blend of a base rubber, a cross-linking agent, a free radical initiator, and one or more fillers or processing aids. A preferred base rubber is a polybutadiene having a cis-1,4 content of above about 90%, and more preferably 98% or above. Such materials are well known to those skilled in the art.

The use of cross-linking agents in a golf ball core is well known, and metal acrylate salts are examples of such cross-linking agents. For example, metal salt diacrylates, dimethacrylates, or mono(meth)acrylates are preferred for use in the golf ball cores of the present invention, and zinc diacrylate is a particularly preferred cross-linking agent. A commercially available suitable zinc diacrylate is SR-416 available from Sartomer Co., Inc., Exton, Pa. Other metal salt di- or mono- (meth)acrylates suitable for use in the present invention include those in which the metal is calcium or magnesium. In the manufacturing process it may be beneficial to pre-mix some cross-linking agent(s), such as, e.g., zinc diacrylate, with the polybutadiene in a master batch prior to blending with other core components.

Free radical initiators are used to promote cross-linking of the base rubber and the cross-linking agent. Suitable free radical initiators for use in the golf ball core 12 of the present invention include peroxides such as dicumyl peroxide, bis-(t-butyl peroxy) diisopropyl benzene, t-butyl perbenzoate, di-t-butyl peroxide, 2,5-dimethyl-2,5-di-5-butylperoxyhexane, 1,1-di (t-butylperoxy) 3,3,5-trimethyl cyclohexane, and the like, all of which are readily commercially available.

Zinc oxide is also preferably included in the core formulation. Zinc oxide may primarily be used as a weight adjusting filler, and is also believed to participate in the cross-linking of the other components of the core (e.g. as a coagent). Additional processing aids such as dispersants and activators may optionally be included. In particular, zinc stearate may be added as a processing aid (e.g. as an activator). Any of a number of specific gravity adjusting fillers may be included to obtain a preferred total weight of the core 12. Examples of such fillers include tungsten and barium sulfate. All such processing aids and fillers are readily commercially available. The present inventors have found a particularly useful tungsten filler is WP102 Tungsten (having a 3 micron particle size) available from Atlantic Equipment Engineers (a division of Micron Metals, Inc.), Bergenfield, N.J.

Table 1 below provides the ranges of materials included in the preferred core formulations of the present invention.

TABLE 1

Core Formulations

| Component | Preferred Range | Most Preferred Range |
|---|---|---|
| Polybutadiene | 100 parts | 100 parts |
| Zinc diacrylate | 20–35 phr | 25–30 phr |
| Zinc oxide | 0–50 phr | 5–15 phr |
| Zinc stearate | 0–15 phr | 1–10 phr |
| Peroxide | 0.2–2.5 phr | 0.5–1.5 phr |
| Filler | As desired | As desired |
| (e.g. tungsten) | (e.g. 2–10 phr) | (e.g. 2–10 phr) |

In the present invention, the core components are mixed and compression molded in a conventional manner known to those skilled in the art. In a preferred form, the finished core 12 has a diameter of about 1.35 to about 1.64 inches for a golf ball 10 having an outer diameter of 1.68 inches. The core weight is preferably maintained in the range of about 32 to about 40 g. The core PGA compression is preferably maintained in the range of about 50 to 90, and most preferably about 55 to 80.

As used herein, the term "PGA compression" is defined as follows:

$$\text{PGA compression value} = 180 - \text{Riehle compression value}$$

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85. While the inventors are aware of formulae contained in U.S. Pat. No. 5,368,304 and U.S. Pat. No. 5,813,923 that state that "PGA compression values=160–Riehle compression value", the inventors have adopted the alternative formula and definition set forth above.

Table 2 sets forth physical data for cores 12 that were manufactured according to the above-description and incorporated into specific embodiments of golf balls 10 of the present invention. Each specific embodiment golf ball 10 is referred to and identified by the same ball example number throughout this specification.

TABLE 2

Core Properties

| Ball Ex. No. | Size (inches) | Specific Gravity | Compression (PGA) |
|---|---|---|---|
| 1 | 1.500 | 1.139 | 68 |
| 2 | 1.505 | 1.142 | 70 |
| 3 | 1.520 | 1.142 | 70 |
| 4 | 1.530 | 1.142 | 70 |
| 5 | 1.494 | 1.157 | 70 |
| 6 | 1.510 | 1.157 | 68 |
| 7 | 1.489 | 1.157 | 60 |
| 8 | 1.510 | 1.155 | 70 |
| 9 | 1.510 | 1.155 | 60 |

As is described above, the present invention preferably includes at least one boundary layer 13 that preferably is composed of a thermoplastic (e.g. thermoplastic or thermoplastic elastomer) or a blend of thermoplastics (e.g. metal containing, non-metal containing or both). However, the golf ball 10 may have several boundary layers 13 disposed between the core 12 and the cover 14. Most preferably the boundary layer 13 is composed of at least one thermoplastic that contains organic chain molecules and metal ions. The metal ion may be, for example, sodium, zinc, magnesium, lithium, potassium, cesium, or any polar metal ion that serves as a reversible cross-linking site and results in high levels of resilience and impact resistance. Suitable commercially available thermoplastics are ionomers based on ethylene copolymers and containing carboxylic acid groups with metal ions such as described above. The acid levels in such suitable ionomers may be neutralized to control resiliency, impact resistance and other like properties. In addition, other fillers with ionomer carriers may be used to modify (e.g. preferably increase) the specific gravity of the thermoplastic blend to control the moment of inertia and other like properties. Exemplary commercially available thermoplastic materials suitable for use in a boundary layer 13 of a golf ball of the present invention include, for example, the following materials and/or blends of the following materials: HYTREL® and/or HYLENE® products from DuPont, Wilmington, Del., PEBEX® products from Elf Atochem, Philadelphia, Pa., SURLYN® products from DuPont, and/or ESCOR® or IOTEK® products from Exxon Chemical, Houston, Tex.

The Shore D hardness of the boundary layer 13 should be about 65 or less. It is preferred that the boundary layer 13 have a hardness of between about 50–65 Shore D. In a preferred embodiment, the boundary layer 13 has a Shore D hardness in the range of about 52–65. One reason for preferring a boundary layer 13 with a Shore D hardness of 65 or lower is to improve the feel of the resultant golf ball. It is also preferred that the boundary layer 13 is composed of a blend of SURLYN® ionomer resins. Table 3 below sets forth physical data for suitable boundary layers 13 that were manufactured and incorporated into specific embodiments of golf balls 10 of the present invention. As is shown in Table 3 below, a boundary layer 13 with a lower Shore D hardness tends to have a lower flexural modulus as well.

and is available from Americhem, Inc., Cuyahoga Falls, Ohio, under the trade designation 38534X1. The specific gravity for each of the boundary layers 13 in Table 3 was 1.007. The flexural modulus provided in Table 3 was determined according to ASTM D790. The Shore D hardness provided in Table 3 was determined according to ASTM D2240.

In the preferred embodiment, the cover 14 of the golf ball 10 of the present invention is composed of a PPDI-based polyurethane system. Although the monomer has a tendency to sublime, thereby making it difficult to handle, the monomer has two isocyanate groups that exhibit widely different reactivities and make it particularly effective at providing polyurethane prepolymers with low content of free PPDI (in the range of 0.1 percent).

As mentioned previously, the polyurethane utilized in the present invention is composed of a PPDI-based prepolymer reacted with a curing agent. The PPDI-based prepolymer is formed from PPDI and a polyol such as an ester polyol, a polyether polyol, or a blend thereof. A preferred polyol is polycaprolactone. The curing agent, or curative, is a diol (e.g., 1,4 butane diol, trimethylpropanol), a mixture of diols (e.g., 1,4 butane diol and ethylene glycol, or other suitable glycols), a hydroquinone, a mixture of hydroquinones, a triol, a mixture of triols, a diamine, a mixture of diamines, an oligomeric diamine, a triamine, or a blend of some or all of these materials. Specifically, the cover 14 of the golf ball 10 of the present invention is most preferably composed of a polyurethane formed from a PPDI-based prepolymer and cured with a mixture of diols, such as, for example, a blend of 1,4 butane diol and glycols. Such a suitable blend of diol and glycols is available from Uniroyal Chemical Company, Inc. Middlebury, Conn., under the name as VIBRACURE® A250 has an equivalent weight of about 45. Other agents which may be utilized during the curing process include trimethyl glycol di-p-aminobenzoate (such as VERSALINK® 740M available from Air Products and

TABLE 3

Boundary Layer Properties

| Ball Ex. No. | SURLYN® %8150 | SURLYN® %9150 | SURLYN® %6320 | Barytes (phr) | Thickness (inches) | FlexMod (psi) | Shore D Hardness |
|---|---|---|---|---|---|---|---|
| 1 | 40 | 40 | 20 | 8 | 0.065 | 55100 | 58 |
| 2 | 50 | 50 | 0 | 9 | 0.050 | 78600 | 61 |
| 3 | 50 | 50 | 0 | 9 | 0.050 | 78600 | 61 |
| 4 | 50 | 50 | 0 | 9 | 0.050 | 78600 | 61 |
| 5 | 32 | 32 | 36 | 9 | 0.058 | 41400 | 55 |
| 6 | 37.5 | 37.5 | 25 | 9 | 0.058 | 51200 | 57 |
| 7 | 40 | 40 | 20 | 9 | 0.058 | 55109 | 58 |
| 8 | 50 | 50 | 0 | 9 | 0.055 | 78600 | 61 |
| 9 | 47.5 | 47.5 | 5 | 9 | 0.050 | 71300 | 61 |

SURLYN® 8150, 9150, and 6320 are, respectively, an ionomer resin composed of a sodium neutralized ethylene/methacrylic acid, an ionomer resin composed of a zinc neutralized ethylene/methacrylic acid, and an ionomer resin composed of a terpolymer of ethylene, methacrylic acid and n-butyl acrylate partially neutralized with magnesium, all of which are all available from DuPont, Polymer Products, Wilmington, Del.

As is indicated in Table 3, all of the boundary layers 13 in the examples include a predetermined amount of a baryte mixture. The baryte mixture is included as 8 or 9 parts per hundred parts of the ionomer resins. One preferred baryte mixture is composed of 80% barytes and 20% of an ionomer, Chemicals, Inc., Allentown, Pa.); toluene ethylene diamine (such as ETHACURE® 100 available from Albemarle Corp., Baton Rouge, La.); cyclohexane dimethanol (readily available); hydroquinone-bis-hydroxyethyl ether (readily available); phenyldiethanol amine mixture (such as VIBRACURE ® A931 available from Uniroyal Chemical Co., Middlebury, Conn.); methylene dianiline sodium chloride complex (such as CAYTOR® 31 available from Uniroyal Chemical Co.); and/or prionene amine (readily available). This list of preferred agents (including chain extenders, cross-linkers and curing agents) is not meant to be exhaustive, as any suitable (preferably polyfunctional) chain extender, cross-linker, or curing agent may be used.

The cover 14 of the golf ball 10 of the present invention is preferably a castable thermoset polyurethane elastomer. For such a thermoset polyurethane elastomer, a PPDI-based prepolymer is preferably cured with at least one diol curative. Such a diol curative includes 1,4-butane diol, trimethylpropanol, or a mixture of diols (such as 1,4-butane diol and glycol, or other suitable glycols), a hydroquinone or mixture of hydroquinones, a triol or mixture of triols, or at least one of a diamine type curative(s), such as, methylenebis(ortho-chloroaniline), or ETHACURE® 300 or ETHACURE® 100 available from Albemarle Corp., or an oligomeric diamine, or a mixture of some or all of these materials, and most preferably using a mixture of 1,4-butane diol and glycols such as is available from Uniroyal Chemical Company, Inc., under the name VIBRACURE® A250.

The weight ratio of the PPDI-based prepolymer to the curative is preferably in the range of about 10:1 to about 30:1. Prior to curing, the PPDI-based prepolymer and curative are preferably stored separately. The PPDI-based polyurethane is formed by first heating and mixing the PPDI-based prepolymer with the curative in a mold, and then curing the mixture by applying heat and pressure for a predetermined time period. Additionally, a catalyst (e.g. dibutyl tin dilaurate, a tertiary amine, etc.) may be added to the mixture to expedite the casting process. Specific suitable catalysts include TEDA dissolved in di propylene glycol (such as TEDA L33 available from Witco Corp. Greenwich, Conn., and DABCO 33 LV available from Air Products and Chemicals Inc.,) which may be added in amounts of 2–5%, and more preferably TEDA dissolved in 1,4-butane diol which may be added in amounts of 2–5%. Another suitable catalyst includes a blend of 0.5% 33LV or TEDA L33 (above) with 0.1% dibutyl tin dilaurate (available from Witco Corp. or Air Products and Chemicals, Inc.) which is added to a curative such as VIBRACURE® A250. Furthermore, additives such as colorants may also be added to the mixture.

Although the golf ball cover 14 of the present invention is preferably manufactured in a casting process, the cover material may alternatively be provided as a thermoplastic polyurethane for injection molding of the cover 14 over the boundary layer 13 and/or core 12. For a thermoplastic polyurethane, the PPDI-based prepolymer is formed by reacting a polyol with PPDI. The PPDI-based prepolymer is then reacted with a chain extender, such as, for example, a diol or mixture of diols, a triol or mixture of triols, a diamine or mixture of diamines, etc. The resulting product is modified using conventional procedures to form a desired thermoplastic material for injection molding of the cover 14 over the boundary layer 13 and/or core 12.

The PPDI-based polyurethane cover 14 of the present invention exhibits good tensile strength, tear properties, and flexural modulus at lower hardnesses. In addition, because the preferred material is PPDI-based, the cover 14 has a tan δ value lower than conventional (e.g. MDI- and TDI-based) thermoplastics and thermoset urethanes. Thus, the PPDI-based polyurethane cover 14 of the present invention loses less energy as heat upon a high distortion or impact event (i.e. hysteresis) compared to these other polyurethane materials. It is believed that the relative superior mechanical and physical properties of the PPDI-based polyurethane cover 14 of the present invention is due to both the rigid rod-like structure of PPDI and the distribution of that structure throughout the polyurethane.

In the preferred embodiment, the PPDI-based prepolymer is preferably a PPDI reacted with a polycaprolactone. The PPDI-based prepolymer material is preferably degassed and warmed in a first holding container prior to processing of the cover 14. The processing temperature for the PPDI-based prepolymer is preferably in the range of about 100–220° F., and most preferably in the range of about 120–200° F. The PPDI-based prepolymer is preferably flowable from the first holding container to a mixing chamber in a range of about 200–1100 grams of material per minute, or as needed for processing. In addition, the PPDI-based prepolymer material may be agitated in the first holding container, in the range of 0–250 rpm, to maintain a more even distribution of material and to eliminate crystallization.

In the preferred embodiment, the curative is a blend of 1,4 butane diol and glycol such as VIBRACURE® A250. As previously mentioned, other curatives may also be utilized in forming the cover 14 of the golf ball of the present invention. The curative is preferably degassed and warmed in a second holding container prior to processing of the cover 14. The processing temperature for the curative is preferably in the range of about 50–230° F., and most preferably in the range of about 80–200° F. The curative is preferably flowable from is the second holding container to the mixing chamber in the range of about 15–75 grams of material per minute, or as needed. If a catalyst is used for processing the cover 14, then the catalyst is added to the curative in the second holding container to form a curative mixture. Suitable catalyst are described above. The curative and catalyst are agitated, in the range of about 0 to 250 rpm, to maintain an even distribution of catalyst in the curative in the second holding container. It is preferred that catalyst is added in an amount in the range of about 0.25–5% by weight of the combined PPDI-based prepolymer and curative. Additives may be added to the curative as desired. It was discovered that hydrolytic instability of the polyurethane polymer may be avoided by the addition of a stabilizer such as STABOXYL® (available from Rheinchemie, Trenton, New Jersey), in amounts of about 0.25–5% of the polyurethane.

The PPDI-based prepolymer and curative mixture are preferably added to the common mixing chamber at a temperature in the range of about 160–220° F. A colorant material, such as, for example, titanium dioxide, barium sulfate, and/or zinc oxide in a glycol or castor oil carrier, and/or other additive material(s) as are well known in the art, may be added to the common mixing chamber. The amount of colorant material added is preferably in the range of about 0–10% by weight of the combined PPDI-based prepolymer and curative materials, and more preferably in the range of about 2–8%. Other additives, such as, for example, polymer fillers, metallic fillers, and/or organic and inorganic fillers (e.g. polymers, balata, ionomers, etc.) may be added as well to increase the specific gravity of the PPDI-based polyurethane cover 14 of the present invention. It was discovered that the addition of barytes (barium sulfate) or a blend of barytes and titanium dioxide (preferably added in a carrier glycol and/or castor oil) to the mixture, in the amounts of about 0.01–30%, may add sufficient weight to the PPDI-based polyurethane cover 14. The added weight to the cover 14 allows for a lower specific gravity for the core 12 thereby allowing for an increased resiliency of the core 12. The entire mixture is preferably agitated in the mixing chamber in the range of about 1 to 250 rpm prior to molding.

The resulting PPDI-based polyurethane cover material has the physical properties as listed in Table 4 below. Table 4 illustrates the exemplary properties of the cover 14 of the present invention as compared to prior cover materials.

TABLE 4

Typical Approximate Values

| Property | Present Invention | Prior Polyurethanes (MDI and TDI) | Ionomers |
| --- | --- | --- | --- |
| Shore D Hardness | 45–60 | 50–60 | 45–75 |
| Tensile Strength psi | 6500–7900 | 3500–4000 | 2000–3500 |
| Bashore Resilience | 55–65% | 45–55% | 50–60% |

As can be seen by comparing the data in Table 4, the cover 14 of the present invention exhibits hardness and resilience comparable to prior materials, however the cover material exhibits a much higher tensile strength than the prior materials.

The cover 14 of the present invention preferably has a thickness of between about 0.02–0.09 inches, or more preferably between about 0.02–0.065 inches, and most preferably between about 0.02–0.04 inches. Table below sets forth physical data for exemplary covers 14 of the present invention that were manufactured and incorporated into specific embodiments of golf balls 10 of the present invention.

TABLE 5

Cover Properties

| Ball Ex. No | Adiprene ® Prepolymer | Thickness inches | Tensile Strength | Specific Gravity | Bashore Resilience | Hardness Shore D |
| --- | --- | --- | --- | --- | --- | --- |
| 1 | LFPX2950 | 0.0265 | 6500 psi | 1.142 | 62–65% | 47D |
| 2 | LFPX1951 | 0.0380 | 7900 psi | 1.220 | 54–57% | 53D |
| 3 | LFPX1951 | 0.0300 | 7900 psi | 1.220 | 54–57% | 53D |
| 4 | LFPX1951 | 0.0251 | 7900 psi | 1.220 | 54–57% | 53D |
| 5 | LFPX2950 | 0.0345 | 6500 psi | 1.142 | 62–65% | 47D |
| 6 | LFPX2950 | 0.0270 | 6500 psi | 1.142 | 62–65% | 47D |
| 7 | LFPX2950 | 0.0380 | 6500 psi | 1.142 | 62–65% | 47D |
| 8 | LFPX2950 | 0.0295 | 6500 psi | 1.142 | 62–65% | 47D |
| 9 | LFPX2950 | 0.0348 | 6500 psi | 1.142 | 62–65% | 47D |

The prepolymers indicated in Table 5 are ADIPRENE® LFPX2950 and ADIPRENE® LFPX1951, which are available from Uniroyal Chemical Company. ADIPRENE® LFPX2950 and LFPX 1951 are both described by Uniroyal Chemical Company as PPDI-terminated polycaprolactone prepolymers. In the examples listed in Table 5, the PPDI-based prepolymer was cured with a 1,4-butane diol mixture (i.e. VIBRACURE® A250 from Uniroyal). The catalyst used was TEDA L33 from Witco Corp. Three percent TEDA L33 was added to the curative for mixing with LFPX2950, and two percent TEDA L33 was added the curative for mixing with LFPX1951. It is believed that blending 0.5% TEDA L33 with 0.1% dibutyl tin dilaurate is a beneficial catalyst for use with LFPX2950 (i.e. where the catalyst blend is added to the curative, e.g. A250).

As is mentioned above, the PPDI-based polyurethane is well suited to be used as a golf ball cover. Particularly, the PPDI-based polyurethane exhibits such good durability that a cover made from the material can be quite thin as compared to golf ball covers made from prior materials. For example, golf balls having covers made from the material of the present invention having thicknesses of between about 0.02–0.04 inches performed well in durability test, as described below. Conventional thermoset polyurethane or polyurea golf ball covers sufficiently durable for use in competitive play (e.g. made from a polyurethane prepolymer, such as MDI, cured with a polyamine and 5–95% by weight of a difunctional glycol, see, Wu, U.S. Pat. No. 5,334,673) have a typical minimum cover thickness of at least twice this range (i.e. at least about 0.04–0.06–0.08 inches).

For example, it is believed that both the Titleist PROFESSIONAL™ and the Maxfli REVOLUTION® golf balls are wound golf balls having conventional polyurethane covers. Several Titleist PROFESSIONAL™ and the Maxfli REVOLUTION® golf balls were tested for durability and cut/shear. Several Titleist DT 2-Piece® golf balls (which is believed to have a polybutadiene core and a lithium ionomer cover that is 0.065" thick) and Precept EV® Extra Spin golf balls (which is believed to have a polybutadiene core and a ionomer cover that is 0.086" thick) were subjected to the same tests. In addition, several golf balls of the present invention, each having a core 12, boundary layer 13 and cover 14 as described above, were also subjected to the same tests, and were found to substantially meet or exceed the median ball failure durability of the other balls.

Specifically, to test ball failure durability six balls of each kind were tested by firing each from an air cannon at a velocity of about 200 feet per second into a ball failure/durability testing box. After being shot, each ball was examined for "failure" (i.e. breakage or out of round). The test was repeated for each ball until it either failed or was fired 99 times. Table 6 below sets forth the ball failure durability data for the tested balls. In addition, cover cut and shear were tested on each ball by simulating a hard hit from a pitching wedge (by dropping a weight on an immobilized ball, perpendicular to the ball surface for cut and at a tangent to the ball surface for shear) and rating any damage on a scale ranging from 1.0 (poor rating, severe damage) to 5.0 (excellent rating, little or no damage). The cover cut and shear testing results are also shown in Table 6.

TABLE 6

Durability and Cut/Shear Testing Data

| Ball Tested | Cover Material | Cover Thickness | Cut/Shear | Durability (shots) Min. | Max. | Median |
|---|---|---|---|---|---|---|
| Titleist Professional ™ | Conventional polyurethane | 0.065" | 2.0/4.0 | 20 | 38 | 30 |
| Maxfli Revolution ® | Conventional polyurethane | 0.050" | 3.5/5.0 | 15 | 24 | 19.5 |
| Titleist DT ® | lithium ionomer | 0.065" | 3.5/1.0 | 32 | 58 | 42 |
| Precept EV ® | Ionomer | 0.086" | 3.0/3.5 | 28 | 161* | 135* |
| Ex. No. 1 | present PPDI-polyurethane | 0.0265 | 3.0/3.0 | 29 | 61 | 59 |
| Ex. No. 2 | present PPDI-polyurethane | 0.0380 | 3.0/2.5 | 63 | 99 | 80 |
| Ex. No. 3 | present PPDI-polyurethane | 0.0300 | 3.0/3.0 | 47 | 98 | 98 |
| Ex. No. 4 | present PPDI-polyurethane | 0.0251 | 3.0/3.0 | 69 | 99 | 98 |
| Ex. No. 5 | present PPDI-polyurethane | 0.0345 | 2.5/3.0 | 12 | 26 | 20 |
| Ex. No. 6 | present PPDI-polyurethane | 0.0270 | 3.0/3.0 | 19 | 57 | 43 |
| Ex. No. 7 | present PPDI-polyurethane | 0.0380 | 4.0/3.0 | 51 | 69 | 60 |
| Ex. No. 8 | present PPDI-polyurethane | 0.0295 | 3.5/3.0 | 14 | 65 | 41 |
| Ex. No. 9 | present PPDI-polyurethane | 0.0348 | 3.0/3.5 | n/a | n/a | n/a |

*The Precept EV balls were tested prior to limiting the maximum number to 99.

The data in Table 6 shows that golf balls 10 having a PPDI-polyurethane cover 14 of the present invention are substantially as cut resistant and nearly as shear resistant and as durable as golf balls having much thicker covers whether those covers are made from ionomers or prior polyurethane materials.

For comparison purposes, several test balls were prepared having cores and boundary layers pursuant to the present invention, but having covers composed of a MDI-based polyurethanes. These MDI example balls each had a core formulated as described above and measuring 1.550 inches. The MDI example balls each had a boundary layer comprising a 1:1 mixture of Surlyn® 8150 and Surlyn® 9150, and having thicknesses as described in Table 6A below. The MDI-based polyurethanes used for the covers of these MDI example balls were prepared by reacting VIBRATHANE® 997 or a 1:1 mixture of VIBRATHANE® 997 and VIBRATHANE® 670 with 1,4-butanediol. VIBRATHANE® 997 and VIBRATHANE® 670 are readily available from Uniroyal Chemical Co. The covers had thicknesses as described in Table 6A below. The MDI example balls were tested for cover shear resistance pursuant to the shear testing procedure described above. The testing results for the MDI example balls are reported in Table 6A.

TABLE 6A

MDI Example Balls Properties and Cover Shear Data

| MDI Example Ball No. | Boundary Thickness (inches) | Vibrathane ® Cover Material | Cover Thickness (inches) | Cover Shear |
|---|---|---|---|---|
| MDI Ex. 1 | 0.035 | 997 | 0.0300 | 1.0–1.5 |
| MDI Ex. 2 | 0.045 | 997 | 0.0200 | 1.5 |
| MDI Ex. 3 | 0.045 | 997:670 (1:1) | 0.0200 | 1.0 |
| MDI Ex. 4 | 0.035 | 997:670 (1:1) | 0.0300 | 1.5–3.0 |

TABLE 6A-continued

MDI Example Balls Properties and Cover Shear Data

| MDI Example Ball No. | Boundary Thickness (inches) | Vibrathane ® Cover Material | Cover Thickness (inches) | Cover Shear |
|---|---|---|---|---|
| MDI Ex. 5 | 0.035 | 997 | 0.0300 | 1.0–1.5 |
| MDI Ex. 6 | 0.045 | 997 | 0.0200 | 1.5 |
| MDI Ex. 7 | 0.045 | 997:670 (1:1) | 0.0200 | 1.0 |

As is shown by comparing the data in the above tables, particularly Tables 6 and 6A, the golf balls 10 of the present invention are much more shear resistant than the MDI example golf balls having covers comprising typical prior MDI-based polyurethane systems.

The diameter of the core 12 and the thickness of the boundary layer 13 and cover 14 of the present invention are dependent on the desired diameter of the golf ball 10. The inner core 12 preferably has a diameter in the range of about 1.35 to 1.70 inches and the boundary layer 13 preferably has a wall thickness in the range of about 0.02 to 0.09 inches. If the desired diameter of the golf ball 10 is about 1.68 inches, then more preferably the core 12 has a diameter in the range of about 1.40 to 1.65 inches and the boundary layer 13 has a wall thickness in the range of about 0.02 to 0.075 inches, and most preferably the core 12 has a diameter in the range of about 1.45 to 1.60 inches and the boundary layer 13 has a wall thickness in the range of about 0.02 to 0.067 inches. If the desired diameter of the golf ball 10 is about 1.8 inches, then more preferably the core 12 has a diameter in the range of about 1.55 to 1.72 inches and the boundary layer 13 has a wall thickness in the range of about 0.02 to 0.09 inches, and most preferably the core 12 has a diameter in the range of about 1.6 to 1.72 inches and the boundary layer 13 has a wall thickness in the range of about 0.02 to 0.06 inches.

In manufacturing the golf ball 10 of the present invention, the boundary layer 13 is preferably injection molded about the inner core 12 in a conventional manner, resulting in a golf ball precursor product composed of a combination of an inner core 12 and a boundary 13. Alternatively, the golf ball precursor product may only be the core 12. Depending on the desired diameter of the golf ball 10, the inner core 12 and the boundary layer 13 combination preferably has an overall diameter in the range of about 1.46 to 1.76 inches. If the desired diameter of the golf ball 10 is about 1.68 inches, then the core 12 and boundary layer 13 combination more preferably has an overall diameter in the range of about 1.55 to 1.64 inches, and most preferably in the range of about 1.6 to 1.64 inches. If the desired diameter of the golf ball 10 is about 1.8 inches, then the core 12 and boundary layer 13 combination more preferably has an overall diameter in the range of about 1.64 to 1.67 inches, and most preferably in the range of about 1.72 to 1.76 inches.

In the preferred manufacturing process, the PPDI-based polyurethane cover material (i.e. the mixture composed of the PPDI-based prepolymer, curative with catalyst, and any additives, such as colorant, etc.) is preferably introduced into a first mold cavity of a mold cavity pair at T0. About 30–90 seconds later (i.e. T0+30–90 seconds or T1) the golf ball precursor product (preferably including a boundary layer 13), which preferably has been preheated as described in detail below, is then held (e.g. via suction equipment) contacting the cover material in the first mold cavity in what will be the spherical center of the mold cavity pair. The cover material is allowed to at least partially cure (typically between about 10–30 seconds, i.e., until about T1+10–30 seconds, i.e. T2), and then the core is released. Concurrently, the cover material is preferably introduced into a second cavity of the mold cavity pair at a time which enables it to set for about 30–90 seconds prior to T2, and then the mold is closed (thereby mating the first mold cavity to the second mold cavity), and subjected to heat and pressure to cure the cover material for about 2–10 minutes at about 140–220° F. and a pressure of about ⅓–2 ton per cavity in the mold thereby forming a cover 14 on the golf ball precursor product. The covered balls are then removed from the mold, allowed to cool, and preferably post-cured at about 140–250° F. for about 4–8 hours.

As is mentioned above, the golf ball precursor product, core or core and boundary layer combination, is preferably preheated prior the casting process. The preheating process is described in detail in co-pending patent application Ser. No. 09/296,197 entitled "Golf Balls and Methods of Manufacturing the Same", which has been assigned to the assignee of the present invention, and which is hereby incorporated by reference as if fully set forth herein. However, the present invention is not limited to the techniques disclosed in this co-pending application.

As is described in the co-pending application, the pre-heating step is preferably accomplished by applying heat to the core and any boundary layers, preferably to cause the core and any boundary layers to undergo thermal expansion. It should be appreciated that while the pre-heating step is described as being after core formation, the present methods also contemplate heating the core both during and after the formation of the golf ball core. In this manner, some of the heat that may be present or liberated in the core from the core formation process may be used in the pre-heating step. By undergoing thermal expansion, the volume of the ball increases from its initial size. Preferably, the core and any intermediate boundary layer is heated, prior to applying the cover, to a temperature of about 135° F. to about 175° F., and more preferably between about 140° F. to about 160° F. This pre-heating preferably occurs for about one hour, or for such time as needed to achieve an amount of thermal expansion prior to cover formation such that the cover will not crack, and/or to achieve a desired improvement in cover molding cycle time, as described below. Although the duration of the pre-heating step is not believed to be critical, this preferred amount of time permits substantially even heating of the core and any intermediate boundary layer and results in substantially steady-state thermal conditions within the core and any intermediate boundary layer.

While the temperature ranges and heating times disclosed above are the preferred ranges and times, it should be noted that the invention is not limited to any exact temperature or heating time. The purpose of the pre-heating step is to subject the core and any intermediate boundary layer to an increase in temperature to cause volumetric thermal expansion. This expansion can occur within any number of absolute temperatures over any period of heating time that fall within the operability range of the materials used. For example, any temperature differential and heating time that causes a sufficient amount of thermal expansion of the core and optional boundary layer can be used. The amount of thermal expansion preferred will vary depending on, at least, the cover material(s) and cover thickness to be used for manufacturing the golf ball 10. For example, for a relatively rigid cover material or a relatively thin cover, it is preferable to cause a relatively larger amount of thermal expansion to the core 12 and optional boundary layer 13 to substantially prevent cover cracking.

The Volumetric thermal expansion of the core 12 and optional boundary layer 13 may be expressed as a percentage, as follows:

$$\left[\frac{(Vol_{final} - Vol_{initial})}{Vol_{initial}} \times 100\right]\%$$

where $Vol_{final}$ is the average volume of the core 12 or the core 12 and one or more optional boundary layers 13 at the high temperature, and $Vol_{initial}$ is the average volume of the core 12 or the core 12 and one or more optional boundary layers 13 at the lower, initial starting temperature. It has been found that a volumetric expansion of at least about 1.2% is substantially sufficient to prevent cover cracking when using a thermoset polyurethane cover material in a casting process. It will be understood, however, that this is not intended to serve as a lower limit for the volumetric thermal expansion. Instead, the lower limit for a given system will depend on the materials, the golf ball construction, and the molding processes used in the system. Determination of this limit for a given system is within the level of skill of those skilled in the art.

After pre-heating the core 12, or the core 12 and one or more optional boundary layers 13, the cover 14 is applied. The cover 14 is preferably applied while the core 12 and optional boundary layers 13 are at an increased temperature, and most preferably at the increased temperature obtained during the pre-heating step.

The present invention provides a very durable cover 14 having an excellent sound and feel, and as such enables designing golf balls having a maximized core size. Maximizing core size typically provides maximum golf ball COR and, therefore, maximum distance for a given golf club head speed. While sound and feel are subjective observations of a golfer, it was attempted to quantify the feel of golf balls 10 of the present invention. About three exemplary golf balls 10 of the present invention (as described in the examples herein) and about three Bridgestone Precept EV® Extra Spin golf balls were provided to various professional golfers and testers who performed side-by-side comparisons both on a fairway (using irons and drivers) and on and around a green (chips and putts). After and while comparing the balls the testers were asked their opinion regarding the feel of the balls (i.e. better or worse than the Precept EV® (Extra Spin golf ball). The Precept EV®) Extra Spin golf ball was chosen for this test even though it has an ionomer cover because it is commonly considered to be a golf ball having a good balance between feel, distance, control, and durability. While it should be understood that the feel of a golf ball is a very subjective observation, a majority of the testers determined that the exemplary balls of the present invention described as examples herein had a feel that was better than the Precept EV® Extra Spin golf balls.

The COR of each ball was also tested. The COR was tested by shooting each ball from an air cannon at various speeds up to about 180 feet per second toward a large rigid mass (e.g. a wall), measuring the velocity of the ball going toward the large rigid mass and the velocity of the ball on rebound, and then calculating the ratio of the velocity of a ball rebound versus the velocity of the ball prior to hitting the wall at each of the various speeds tested. A curve was then graphed to fit the various calculated ratio points at the corresponding test speed, and then the COR was taken as that point at an intersection of the curve with a speed of 143.8 feet per second. The Precept EV® Extra Spin ball was tested as having a COR of 77.4, the Titleist DT® ball had a COR of 78.8, the Titleist PROFESSIONAL™ ball had a COR of 77.2, and the Maxfli REVOLUTION® ball had a COR of 77.1. As is shown in Table 7 below, the exemplary golf balls of the present invention all have superior or substantially similar CORs to those presently available.

TABLE 7

COR Data

| Golf Ball | COR |
|---|---|
| Precept EV ® Extra Spin | 77.4 |
| Titleist DT ® | 78.8 |
| Titleist Professional ™ | 77.2 |
| Maxfli Revolution ® | 77.1 |
| Ex. No. 1 | 78.4 |
| Ex. No. 2 | 78.2 |
| Ex. No. 3 | 78.3 |
| Ex. No. 4 | 78.5 |
| Ex. No. 5 | 77.9 |
| Ex. No. 6 | 78.8 |
| Ex. No. 7 | 77.8 |
| Ex. No. 8 | 79.4 |
| Ex. No. 9 | N/A |

In addition, golf balls 10 of the present invention were analytically evaluated for distance performance. Generally, it is well understood by those skilled in the art that the distance a golf ball will travel may be predicted based on certain measured robot testing initial launch information (e.g. initial velocity, spin, launch angle, etc.) and certain aerodynamic properties (e.g. lift and drag characteristics during flight). Based on such analytical predictions the balls of the present invention were found to travel farther than prior balls.

Thus, the cover 14 of the preferred golf ball 10 of the present invention, exhibits enhanced feel both on the fairways and on the greens, and enables a ball having superior coefficients of restitution and farther predicted distance for a given set of initial launch conditions.

In summary, a golf ball 10 of the present invention has a cover 14 made from the PPDI-based polyurethane described above. As is described above, the overall thickness of the cover 14 of the present invention is preferably about 0.02 to 0.09 inches, more preferably about 0.02 to 0.065 inches, and most preferably about 0.02 to 0.04 inches. Thus, if the desired diameter of the golf ball 10 is about 1.68 inches, then the combination of the core 12 and boundary layer 13 preferably has an overall diameter in the range of about 1.50 to 1.64 inches, more preferably has an overall diameter in the range of about 1.55 to 1.64 inches, and most preferably has an overall diameter in the range of about 1.60 to 1.64 inches. This configuration enables use of a boundary layer 13 which is preferably stiff relative to the core 12 to give a resultant ball 10 a substantially similar or even higher COR as compared to conventional balls and, therefore, a comparatively further overall distance. In addition, the thin cover enables golf balls having large cores. It is well understood that increasing the core diameter of a golf ball generally translates into an improved feel with increased COR which in turn generally translates into an increased initial velocity and enhanced overall travel distance. Furthermore, use of a boundary layer 13 enables manipulation of the specific gravity of each layer to maximize the moment of inertia of the ball to lower spin rate to provide better playability and control, and optimized straightness, flatness, and length of driven golf ball.

It is preferred that a golf ball 10 of the present invention has a core 12, a boundary layer 13 and a PPDI-based polyurethane cover 14. The solid core 12 is composed of an elastomeric material having a diameter of between about 1.35–1.70 inches (depending on the desired final size of the ball), and a PGA compression of between about 50–80. The boundary layer 13 is composed of a thermoplastic (e.g. thermoplastic and/or thermoplastic elastomer) material having a hardness of between about 52–65 Shore D, a flexural modulus of between about 25,000–65,000 psi, and a wall thickness of between about 0.02–0.09 inches. The PPDI-based polyurethane cover 14 has a hardness of between about 45–60 Shore D, a flexural modulus of between about 12,000–35,000 psi, a Bashore resilience of between about 57–65, a tensile strength of between about 5900–7500 psi, and a wall thickness of between about 0.02–0.065 inches. While the cover 14 is described as preferably covering a solid core having a boundary layer, it could also be used on different cores such as wound, foam, hollow, or multilayered cores.

Exemplary golf balls 10 (examples numbered 1–9) embodying the above-described invention were prepared and tested according to the descriptions given above. The golf balls 10 were each constructed having a core 12 made from the materials and having the properties described in the text and Tables 1 and 2 above, a boundary layer 13 made from the materials and having the properties described in the text and Table 3 above, and a PPDI-based polyurethane cover 14 made from the materials and having the properties described in the text and Table 5 above. The finished balls were analyzed for their weight, PGA compression, and, as is reported in Table 7 above, COR. The results of these analyses are reported in Table 8 below.

TABLE 8

Miscellaneous Ball Data

| Ball Ex. No. | Ave Diameter (inches) | Average Weight (g) | PGA Compression |
|---|---|---|---|
| 1 | 1.6830 | 45.29 | 98 |
| 2 | 1.6811 | 45.66 | 98 |

TABLE 8-continued

Miscellaneous Ball Data

| Ball Ex. No. | Ave Diameter (inches) | Average Weight (g) | PGA Compression |
|---|---|---|---|
| 3 | 1.6800 | 45.57 | 98 |
| 4 | 1.6802 | 45.70 | 95 |
| 5 | 1.6790 | 45.68 | 89 |
| 6 | 1.6789 | 45.54 | 95 |
| 7 | 1.6809 | 45.66 | 87 |
| 8 | 1.6790 | 45.80 | 102 |
| 9 | 1.6797 | 45.63 | 89 |

Table 9 below compiles the data shown above for the nine exemplary balls of the present invention as described above.

TABLE 9

Compilation of Data

| Property | Ball Ex. 1 | Ball Ex. 2 | Ball Ex. 3 | Ball Ex. 4 | Ball Ex. 5 | Ball Ex. 6 | Ball Ex. 7 | Ball Ex. 8 | Ball Ex. 9 |
|---|---|---|---|---|---|---|---|---|---|
| Core | | | | | | | | | |
| Size (inches) | 1.500 | 1.505 | 1.520 | 1.530 | 1.494 | 1.510 | 1.489 | 1.510 | 1.510 |
| Specific Gravity | 1.139 | 1.142 | 1.142 | 1.142 | 1.157 | 1.157 | 1.157 | 1.155 | 1.155 |
| Compression* | 68 | 70 | 70 | 70 | 70 | 68 | 60 | 70 | 60 |
| Mantle Layer | | | | | | | | | |
| % Surlyn 8150 | 40 | 50 | 50 | 50 | 32 | 37.5 | 40 | 50 | 47.5 |
| % Surlyn 9150 | 40 | 50 | 50 | 50 | 32 | 37.5 | 40 | 50 | 47.5 |
| % Surlyn 6320 | 20 | 0 | 0 | 0 | 36 | 25 | 20 | 0 | 5 |
| % Barytes | 8 | 9 | 9 | 9 | 9 | 9 | 9 | 9 | 9 |
| Thickness (inches) | 0.065 | 0.050 | 0.050 | 0.050 | 0.058 | 0.058 | 0.058 | 0.055 | 0.050 |
| Flexural Modulus** | 55100 | 78600 | 78600 | 78600 | 41400 | 51200 | 55100 | 78600 | 71300 |
| Specific Gravity | 1.007 | 1.007 | 1.007 | 1.007 | 1.007 | 1.007 | 1.007 | 1.007 | 1.007 |
| Hardness*** | 58 | 61 | 61 | 61 | 55 | 57 | 58 | 61 | 61 |
| Cover | | | | | | | | | |
| Adiprene Prepolymer | LFPX 2950 | LFPX 1951 | LFPX 1951 | LFPX 1951 | LFPX 2950 | LFPX 2950 | LFPX 2950 | LFPX 2950 | LFPX 2950 |
| Thickness (inches) | .0265 | .0380 | .0300 | .0251 | .0345 | .0270 | .0380 | .0295 | .0348 |
| Tensile Strength (psi) | 6500 | 7900 | 7900 | 7900 | 6500 | 6500 | 6500 | 6500 | 6500 |
| Specific Gravity | 1.142 | 1.220 | 1.220 | 1.220 | 1.142 | 1.142 | 1.142 | 1.142 | 1.142 |
| Bayshore Rebound % | 62–65 | 54–57 | 54–57 | 54–57 | 62–65 | 62–65 | 62–65 | 62–65 | 62–65 |
| Flexural Modulus** | >10K | >10K | >10K | >10K | >10K | >10K | >10K | >10K | >10K |
| Hardness*** | 47 | 53 | 53 | 53 | 47 | 47 | 47 | 47 | 47 |
| Overall Ball | | | | | | | | | |
| Cut | 3.0 | 3.0 | 3.0 | 3.0 | 2.5 | 3.0 | 4.0 | 3.5 | 3.0 |
| Shear | 3.0 | 2.5 | 3.0 | 3.0 | 3.0 | 3.0 | 3.0 | 3.0 | 3.5 |
| Durability: | | | | | | | | | |
| Maximum | 61 | 99 | 98 | 99 | 26 | 57 | 69 | 65 | n/a |
| Minimum | 29 | 63 | 47 | 69 | 12 | 19 | 51 | 14 | n/a |
| Median | 59 | 80 | 98 | 98 | 20 | 43 | 60 | 41 | n/a |
| COR 143.8 fps | 78.4 | 78.2 | 78.3 | 78.5 | 77.9 | 78.8 | 77.8 | 79.4 | n/a |
| Ave. Diameter (inches) | 1.683 | 1.681 | 1.680 | 1.680 | 1.679 | 1.679 | 1.681 | 1.679 | 1.680 |
| Ave. Weight (grams) | 45.29 | 45.66 | 45.57 | 45.70 | 45.68 | 45.54 | 45.66 | 45.80 | 45.63 |
| Ave. Compression* | 98 | 98 | 98 | 95 | 89 | 95 | 87 | 102 | 89 |

*PGA compression;
**ASTM D790;
***Shore D, ASTM D2240;

While embodiments of the present invention have been shown and described, various modifications may be made without departing from the scope of the present invention, and all such modifications and equivalents are intended to be covered. For example, the size and thickness ranges given are primarily directed to a ball having a finished diameter of about 1.68 inches which would thereby comply with current regulations of the United States Golf Association. However, balls of different sizes are considered to be included within the scope of the present invention.

I claim as my invention the following:

1. A golf ball comprising:
   a core; and
   a thermoset polyurethane cover formed from reactants comprising a p-phenylene diisocyanate prepolymer and a mixture of diols.

2. The golf ball according to claim 1 further comprising at least one boundary layer disposed between the core and the thermoset polyurethane cover.

3. The golf ball according to claim 1 wherein the thermoset polyurethane cover has a tensile strength in the range of about 6500 to about 7900 psi.

4. The golf ball according to claim 1 wherein the p-phenylene diisocyanate prepolymer comprises p-phenylene diisocyanate and one or more polyester polyols, polyether polyols or a mixture thereof.

5. The golf ball according to claim 1 wherein the p-phenylene diisocyanate prepolymer comprises p-phenylene diisocyanate and a polycaprolactone polyol.

6. The golf ball according to claim 1 wherein the reactants forming the thermoset polyurethane cover further comprise at least one catalyst.

7. The golf ball according to claim 6 wherein the catalyst is a tertiary amine.

8. The golf ball according to claim 1 wherein the reactants forming the thermoset polyurethane cover further comprise at least one colorant, filler, processing aid, stabilizer, or mixture thereof.

9. The golf ball according to claim 8 wherein the reactants forming the thermoset polyurethane cover further comprise at least one stabilizer that retards hydrolytic instability.

10. The golf ball according to claim 1 wherein the thermoset polyurethane cover has a hardness of between about 45–60 Shore D, a flexural modulus of between about 12,000–35,000 psi, a Bashore resilience of between about 57–65, and a tensile strength of between about 5900–7500 psi.

11. The golf ball according to claim 1 wherein the thermoset polyurethane cover has a thickness of less than about 0.04 inches.

12. A golf ball comprising:
  a core;
  a boundary layer encompassing the core, the boundary layer composed of a thermoplastic material; and
  a PPDI-based thermoset polyurethane cover formed from components comprising a p-phenylene diisocyanate prepolymer and a mixture of diols.

13. The golf ball according to claims 12 wherein the boundary layer comprises at least one ionomer or a blend of ionomers.

14. The golf ball according to claim 12 wherein the boundary layer has a Shore D hardness less than 65.

15. The golf ball according to claim 12 wherein the core comprises polybutadiene rubber and tungsten.

16. The golf ball according to claim 12 wherein the core comprises at least one construction from the group consisting of solid, wound, foam, hollow and multi-layered.

17. The golf ball according to claim 12 wherein the core has a diameter of at least about 1.4 inches and the golf ball has a diameter of about 1.68 inches.

18. The golf ball according to claim 17 wherein the PPDI-based thermoset polyurethane cover has a thickness of no more than about 0.04 inches.

19. The golf ball according to claim 17 wherein the PPDI-based thermoset polyurethane cover has a thickness of no more than 0.03 inches.

20. The golf ball according to claim 12 wherein the components forming the PPDI-based thermoset polyurethane cover p-phenylene diisocyanate and one or more polyester polyols, polyether polyols or a mixture thereof.

21. The golf ball according to claim 12 wherein the boundary layer has a flexural modulus of 65,000 pounds per square inch or less.

22. The golf ball according to claim 12 wherein the PPDI-based thermoset polyurethane cover has a hardness of between about 45–60 Shore D, a flexural modulus of between about 12,000–35,000 psi, a Bashore resilience of between about 57–65, and a tensile strength of between about 5900–7500 psi.

* * * * *